United States Patent
Goren et al.

(10) Patent No.: US 7,167,511 B1
(45) Date of Patent: Jan. 23, 2007

(54) MODEM WAKE-UP AT STEADY STATE IN A MODEM POOL ENVIRONMENT

(75) Inventors: Dan Goren, Ramat Gan (IL); Amir Kantschuk, Ramat Gan (IL)

(73) Assignee: Actelis Networks Inc, Fremont, CA (US)

( * ) Notice: Subject to any disclaimer, the term of this patent is extended or adjusted under 35 U.S.C. 154(b) by 1149 days.

(21) Appl. No.: 09/722,486

(22) Filed: Nov. 28, 2000

Related U.S. Application Data (63) Continuation-in-part of application No. 09/510,550, filed on Feb. 22, 2000.
(60) Provisional application No. 60/121,228, filed on Feb. 23, 1999.

(51) Int. Cl.
*H04L 5/16* (2006.01)

(52) U.S. Cl. .................. 375/222; 375/350; 370/201; 370/286; 379/406; 455/295; 455/296

(58) Field of Classification Search ................ 375/219, 375/220, 222, 257, 259, 346, 350; 370/201, 370/230, 286, 290; 379/406, 410, 411; 455/296, 455/295
See application file for complete search history.

(56) References Cited

U.S. PATENT DOCUMENTS 6,160,790 A * 12/2000 Bremer .................. 370/201
6,188,669 B1 * 2/2001 Bellenger ................ 370/230
6,687,288 B1 * 2/2004 Shteiman ................ 375/222

OTHER PUBLICATIONS

U.S. Appl. No. 09/643,821, filed Aug. 22, 2000, Shteiman.
U.S. Appl. No. 09/510,550, filed Feb. 22, 2000, Barlev et al.
J. Cioffi, S.T. Chung W. Yu, "Autonomous Level 0 DSM Results: iterative–water–filling for ADSL and VDSL", T1E1.4/2002–057.

* cited by examiner

*Primary Examiner*—Dac V. Ha
(74) *Attorney, Agent, or Firm*—Eitan, Pearl, Latzer & Cohen Zedek, LLP (57) ABSTRACT

In a communications system having a modem pool including native modems operating at steady state, a method is provided for modem wake-up at steady-state including measuring modem performance, activating a foreign modem at substantially the foreign modem's maximum data rate and at a power level that is below the foreign modem's normal operational power level, allocating a NEXT cancellation filter as a probe filter, iteratively, until the foreign modem is operating at its normal operational power level, or the modem performance of any of the native modems has degraded subsequent to activating the foreign modem, canceling, using the probe filter, NEXT caused to a native modem by the foreign modem, measuring modem performance, and, if the modem performance of any of the native modems has not degraded, increasing the foreign modem's power level, and, if the modem performance of any of the native modems has degraded, deactivating the foreign modem.

12 Claims, 6 Drawing Sheets

MODEM WAKE-UP AT STEADY STATE IN A MODEM POOL ENVIRONMENT

CROSS REFERENCE TO RELATED APPLICATIONS

This application is a Continuation-In-Part application of U.S. patent application Ser. No. 09/510,550 filed Feb. 22, 2000, and entitled "High Speed Access System Over Copper Cable Plant," that claims priority from U.S. Provisional Application Ser. No. 60/121,228, filed Feb. 23, 1999, and entitled "Access Express-Very High Data Rate Communication Channels Over Copper," both hereby incorporated by reference in their entirety.

FIELD OF THE INVENTION

The present invention relates to telecommunications systems in general, and more particularly to modem wake-up at steady state in a modem pool environment.

BACKGROUND OF THE INVENTION

The ever-increasing demand for high-speed data communications services and greater bandwidth is largely due to the popularity of the Internet and other data-intensive, high bandwidth applications. Both businesses and consumers are demanding higher bandwidth connections and faster Internet access. Another source for this demand is the increasing use by businesses of data communications networks, most notably the Internet, for the transmission of documents and electronic mail.

Digital Subscriber Line (DSL) technology provides one approach to addressing the demand for high-speed telecommunications service. DSL technology refers to several types of services that use advanced modem elements to transmit digital signals from a data source over copper wires. Many telephone companies have embraced DSL technology as an immediate broadband solution to serve the current demand by getting more out of their existing copper infrastructure. DSL modem elements permit high data rate transmission of data over the access segment of the public switched telephone network (PSTN) at multiple megabit speeds using sophisticated signal processing techniques that permit voice and data to travel simultaneously over the same analog copper twisted pair wire.

One of the challenges facing DSL technology is that of near-end cross-talk (NEXT) cancellation. NEXT is defined as the cross-talk interference between the receiving path and the transmitting path of different transceivers at the same end of a communications channel that make use of wiring that shares the same cable. The NEXT effect in a cable depends on the number of interfering lines, and increases as the bandwidth that the signals occupy increases. In a modem pool environment where streams of data are distributed to many lines within a single, dedicated cable, the NEXT that the receivers need to overcome is mainly generated by the transmissions of the modem pool itself. Since such a system has access to the transmitted information for a plurality of modems, such information may be used to cancel the interference that leaks into the receivers, thus increasing the noise floor of each receiver.

Another cross-talk phenomena is known as far-end cross-talk (FEXT), which is defined as the cross-talk interference between the receiving path and the transmitting path of different transceivers at opposite ends of a communications channel that make use of wiring that shares the same cable.

In classic NEXT cancellation, a transmitter transmitting via one wire or wire grouping (e.g., twisted pair) affects the receiver receiving via another wire or wire grouping. For each transmit and receive path of an individual modem, a hybrid circuit separates the received signal from the transmitted interfering signal, but since the hybrid cannot completely separate the transmit path from the receive path, some of the transmitted signal leaks into the receiver and becomes an interfering signal. A canceller then filters out the effect of the interfering signal, resulting in a "cleaned" received signal. For a single modem, this problem may be addressed using classic echo cancellation techniques. In a modem pool environment, however, where several modems transmit via a shared cable, there are currently no techniques that effectively address how each receiver takes into account all other interfering transmitters.

In a conventional approach for NEXT cancellation in a modem pool environment, all modems on both sides of the communications channel are activated, as are all adaptive NEXT filters, and the NEXT filters are allowed to converge over time. Unfortunately, in such an approach the received signal is comprised not only of NEXT, but of the far signal, self-echo, FEXT, and other noise as well. Since self-echo and the other noise components are collectively a much bigger factor than NEXT, the NEXT filters will necessarily converge more slowly and less efficiently than were other noise components not present. Such systems are relatively complex to implement, since the number of filters required would equal the square of the number of modems in the pool. Furthermore, inserting a new modem into the modem pool at steady state would negatively affect the performance of all other modems and NEXT cancellation filters as the new modem would generate its own NEXT and disturb the other modems already in the modem pool.

SUMMARY OF THE INVENTION

The present invention seeks to provide techniques for NEXT cancellation in a modem pool environment, particularly with regard to modems inserted at steady state.

In one aspect of the present invention in a communications system having a modem pool for communicating via a communications channel, the modem pool including a plurality of native modems operating at steady state, a method is provided for modem wake-up at steady-state including the steps of a) measuring modem performance of any of the native modems, b) activating a foreign modem in the modem pool at substantially the foreign modem's maximum data rate and at a power level that is below the foreign modem's normal operational power level, c) allocating at least one NEXT cancellation filter as a probe filter, d) iteratively, until i) the foreign modem is operating at the foreign modem's normal operational power level, or ii) the modem performance of any of the native modems has degraded subsequent to activating the foreign modem, d1) canceling, using the probe filter, NEXT caused to at least one of the native modems by the foreign modem, d2) measuring modem performance of any of the native modems, and d3) if the modem performance of any of the native modems has not degraded subsequent to activating the foreign modem, increasing the foreign modem's power level, and e) if the modem performance of any of the native modems has degraded subsequent to activating the foreign modem, deactivating the foreign modem.

In another aspect of the present invention the method further includes synchronizing the foreign modem to an optimal data transmission rate.

In another aspect of the present invention the method further includes activating at least one NEXT cancellation filter to filter NEXT caused to the foreign modem by any of the native modems.

In another aspect of the present invention in a communications system having a modem pool for communicating via a communications channel, the modem pool including a plurality of native modems operating at steady state, a method is provided for modem wake-up at steady-state including the steps of a) measuring modem performance of any of the native modems, b) activating a foreign modem in the modem pool at substantially the foreign modem's maximum data rate and at a power level that is below the foreign modem's normal operational power level, c) allocating at least one NEXT cancellation filter as a probe filter, d) iteratively, until i) the foreign modem is operating at the foreign modem's normal operational power level, or ii) the modem performance of any of the native modems has degraded subsequent to activating the foreign modem, d1) canceling, using the probe filter, NEXT caused to at least one of the native modems by the foreign modem, d2) measuring modem performance of any of the native modems, and d3) if the modem performance of any of the native modems has not degraded subsequent to activating the foreign modem, increasing the foreign modem's power level, and e) if the modem performance of any of the native modems has degraded subsequent to activating the foreign modem, decreasing the power level of the foreign modem to a previous power level at which the modem performance of any of the native modems had not degraded.

In another aspect of the present invention the method further includes synchronizing the foreign modem to an optimal data transmission rate.

In another aspect of the present invention the method further includes activating at least one NEXT cancellation filter to filter NEXT caused to the foreign modem by any of the native modems.

In another aspect of the present invention a communications system is provided including a modem pool for communicating via a communications channel, the modem pool including a plurality of native modems operating at steady state, an inactive foreign modem, and at least one NEXT cancellation filter, where the modem pool is operative to a) measure modem performance of any of the native modems, b) activate the foreign modem in the modem pool at substantially the foreign modem's maximum data rate and at a power level that is below the foreign modem's normal operational power level, c) allocate the at least one NEXT cancellation filter as a probe filter, d) iteratively, until i) the foreign modem is operating at the foreign modem's normal operational power level, or ii) the modem performance of any of the native modems has degraded subsequent to activating the foreign modem, d1) cancel, using the probe filter, NEXT caused to at least one of the native modems by the foreign modem, d2) measure modem performance of any of the native modems, and d3) if the modem performance of any of the native modems has not degraded subsequent to activating the foreign modem, increase the foreign modem's power level, and e) if the modem performance of any of the native modems has degraded subsequent to activating the foreign modem, deactivate the foreign modem.

In another aspect of the present invention the foreign modem is additionally operative to synchronize to an optimal data transmission rate.

In another aspect of the present invention the at least one NEXT cancellation filter includes a plurality of NEXT cancellation filters, and where the foreign modem is operative to activate any of the plurality of NEXT cancellation filters to filter NEXT caused to the foreign modem by any of the native modems.

In another aspect of the present invention a communications system is provided including a modem pool for communicating via a communications channel, the modem pool including a plurality of native modems operating at steady state, an inactive foreign modem, and at least one NEXT cancellation filter, where the modem pool is operative to a) measure modem performance of any of the native modems, b) activate the foreign modem in the modem pool at substantially the foreign modem's maximum data rate and at a power level that is below the foreign modem's normal operational power level, c) allocate the at least one NEXT cancellation filter as a probe filter, d) iteratively, until i) the foreign modem is operating at the foreign modem's normal operational power level, or ii) the modem performance of any of the native modems has degraded subsequent to activating the foreign modem, d1) cancel, using the probe filter, NEXT caused to at least one of the native modems by the foreign modem, d2) measure modem performance of any of the native modems, and d3) if the modem performance of any of the native modems has not degraded subsequent to activating the foreign modem, increase the foreign modem's power level, and e) if the modem performance of any of the native modems has degraded subsequent to activating the foreign modem, decrease the power level of the foreign modem to a previous power level at which the modem performance of any of the native modems had not degraded.

In another aspect of the present invention the foreign modem is additionally operative to synchronize to an optimal data transmission rate.

In another aspect of the present invention the at least one NEXT cancellation filter includes a plurality of NEXT cancellation filters, and where the foreign modem is operative to activate any of the plurality of NEXT cancellation filters to filter NEXT caused to the foreign modem by any of the native modems.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
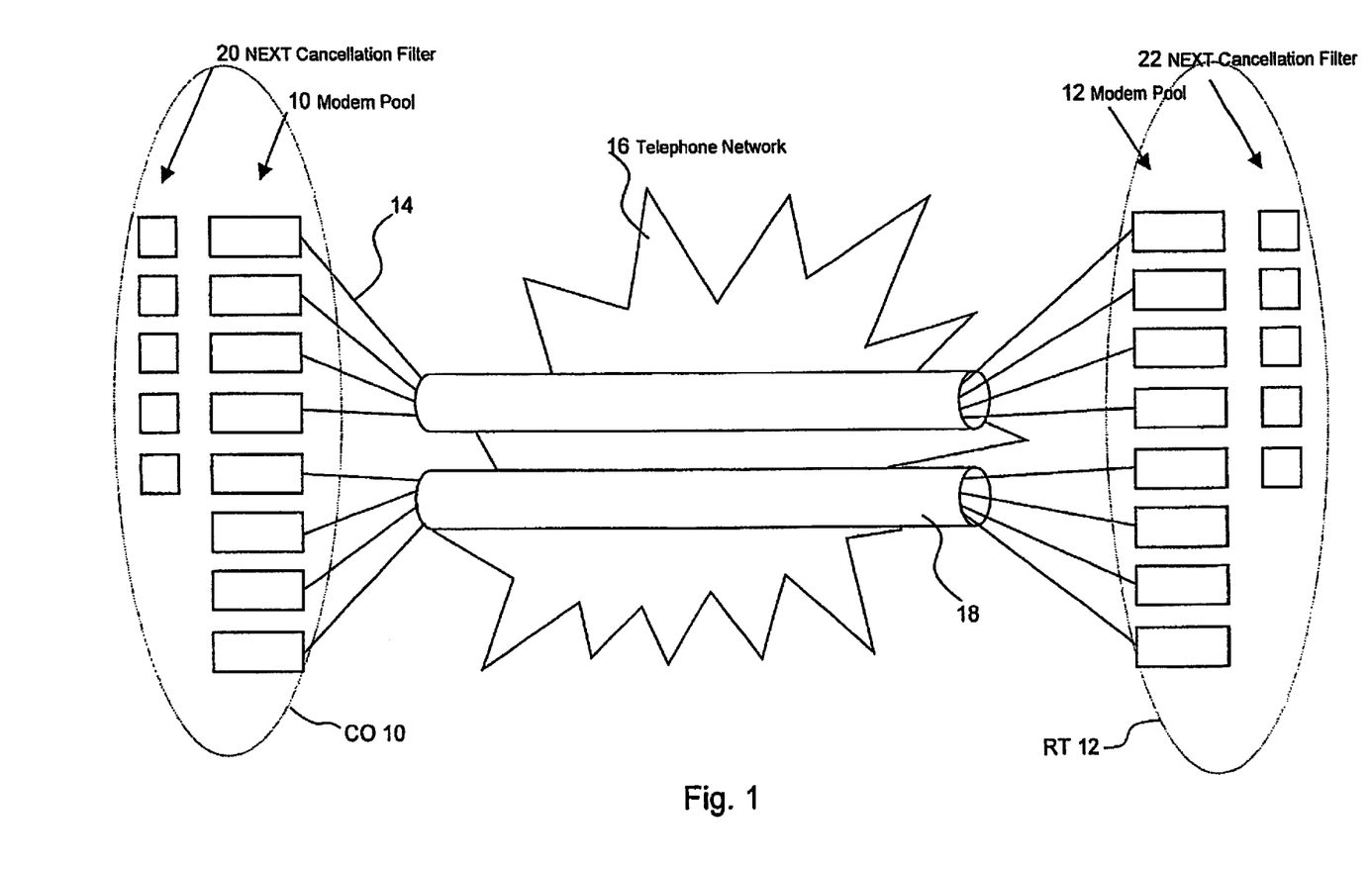
FIG. 1 is a simplified pictorial illustration of a modem pool arrangement useful in understanding the present invention.

Reference is now made to FIG. 1, which is a simplified pictorial illustration of a modem pool arrangement useful in understanding the present invention. A first modem pool, generally referenced 10, and comprising a plurality of individual modems is seen in communication with a second modem pool, generally referenced 12, via a plurality of connections 14 over a telephone network 16. Connections 14 are typically copper wire pairs arranged in one or more bundles 18. Modem pools 10 and 12 typically operate from central office (CO) and remote terminal (RT) locations respectively, and are alternatively referred to herein as CO 10 and RT 12. The modem pools preferably operate in a coordinated manner, such as is described in Applicant/assignee's U.S. patent application Ser. No. 09/510,550 filed Feb. 22, 2000, and entitled "High Speed Access System Over Copper Cable Plant," that claims priority from U.S. Provisional Application Ser. No. 60/121,228, filed Feb. 23, 1999, and entitled "Access Express-Very High Data Rate Communication Channels Over Copper," both hereby incorporated by reference.

Each modem pool in FIG. 1 typically includes one or more NEXT cancellation filters 20 and 22 respectively, the operation of which is described in greater detail hereinbelow with reference to FIG. 2. It is a particular feature of the present invention that, in a modem pool of N modems, less than $N^2$ NEXT cancellation filters may be used in support of NEXT cancellation.

Figure 2:
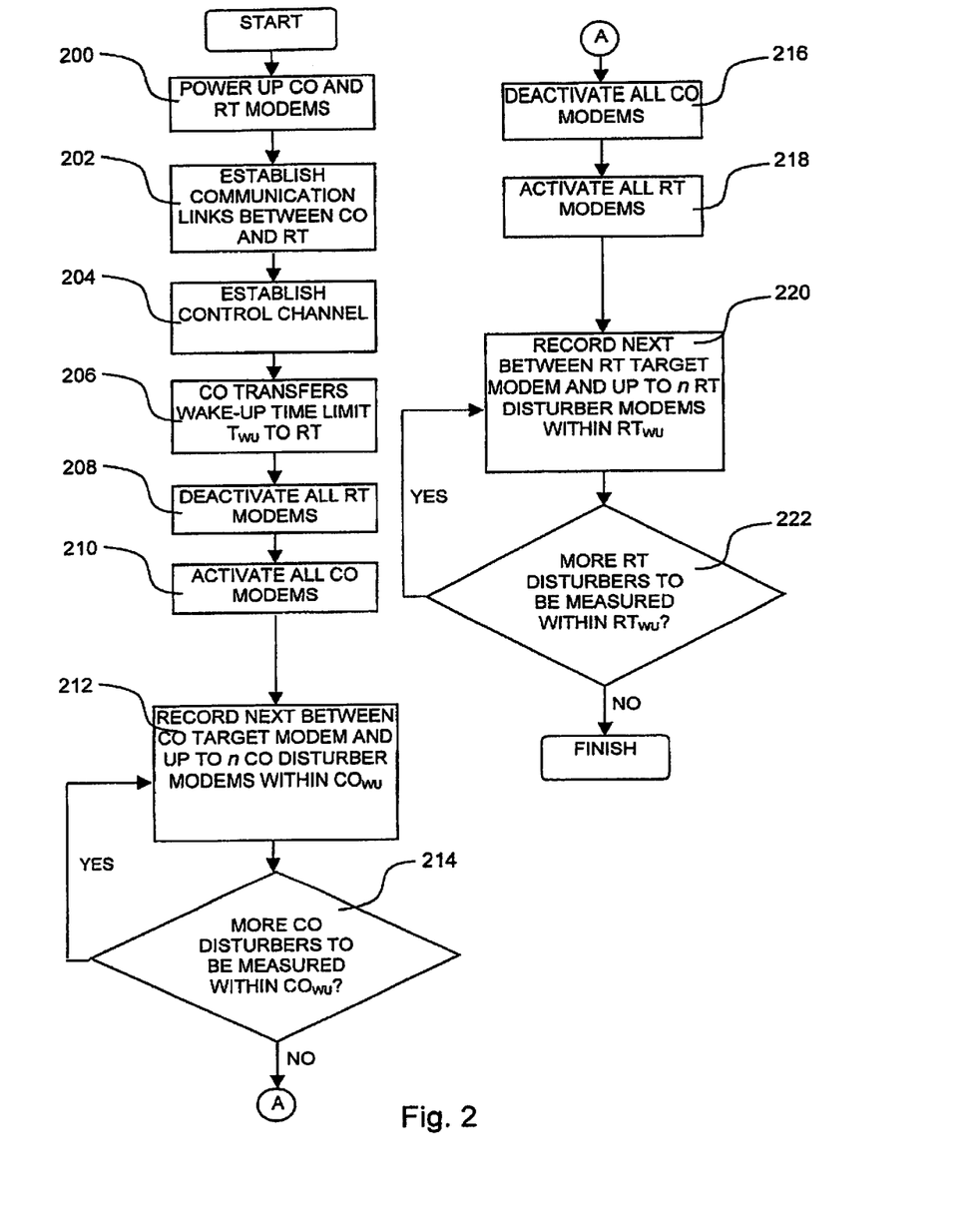
FIG. 2 is a simplified flowchart illustration of a method of modem wake-up of the system of FIG. 1, useful in understanding the present invention.

Reference is now made to FIG. 2, which is a simplified flowchart illustration of a method of modem wake-up of the system of FIG. 1, useful in understanding the present invention. In the method of FIG. 2 the modems of CO 10 and RT 12 are powered-up (step 200), and communications links are established between CO 10 and RT 12, typically at their minimum transmission rate (step 202). A system control channel is then established using at least one of the communication links (step 204). CO 10 then transfers a predetermined wake-up time limit, $T_{wu}$, to RT 12 using the control channel (step 206). Once $T_{wu}$ is received at RT 12, one or more, and preferably all, of the RT 12 modems are deactivated and thereby prevented from communicating with CO 10, typically by placing the modem in a receive-only mode or by turning the modem off (step 208).

During a first time period $T_{wu}$, referred to as $CO_{wu}$, one or more, and preferably all, of the modems at CO 10 are activated, typically such that the transmitted signal occupies the entire usable bandwidth, such as by operating at their maximum transmission rate and/or maximum power (step 210). Throughout this phase the copper lines are preferably used in a simplex mode. The n NEXT cancellation filters 20 at CO 10 are activated for a single target modem, and the NEXT transfer function is measured and recorded, typically in a central database, for the target modem and each of up to n "disturber" modems of the CO 10 modem pool (step 212). Each NEXT transfer function may be measured in the time domain and/or the frequency domain, and reflects the NEXT experienced by the target modem due to a disturber modem with which the target modem is paired during the measurement NEXT measurement may be accomplished by an adaptive FIR filter, trained to mimic the cross lines transfer function. Step 212 may be repeated for several NEXT measurement cycles, particularly where there are fewer NEXT cancellation filters than disturber modems (step 214). The NEXT cancellation filters 20 preferably measure different modem pairs during each cycle, provided that $CO_{wu}$ hasn't elapsed. For example, if there are 25 filters available to measure the NEXT from 100 potential disturber modems, four measurement cycles would be required for each modem being measured.

Once the $CO_{wu}$ time period has elapsed, one or more, and preferably all, of the modems at CO 10 are deactivated and thereby prevented from communicating with RT 12, typically by placing the modem in a receive-only mode or by turning the modem off (step 216), and steps 210–214 may be repeated for the modems at RT 12 for an additional To time period, referred to as RT. One or more, and preferably all, of the modems at RT 12 are activated, typically such that the transmitted signal occupies the entire usable bandwidth, such as by operating at their maximum transmission rate and/or maximum power (step 218), the m NEXT cancellation filters 22 at RT 12 are activated for a single target modem, and the NEXT transfer function is measured and recorded for the target modem and each of up to m disturber modems of the RT 12 modem pool (step 220), with step 220 being repeated for several NEXT measurement cycles as necessary to measure one or more, and preferably all, of target modem-disturber pairs prior to the $RT_{wu}$ time period elapsing (step 222).

The NEXT measurements taken during the wake-up process are thus free of far signal and FEXT noise components and may be subsequently used to initialize the NEXT cancellation filters when beginning normal operation. Preferably, after the method of FIG. 2 is carried out, CO 10 and RT 12 configure their modems to a stable, agreed-upon, or otherwise predetermined rate (e.g. their minimum transmission rates) and re-establish a control channel. CO 10 then activates its NEXT cancellation filters for one or more, and preferably all, of its modems and instructs RT 12 to likewise activate its NEXT cancellation filters for one or more, and preferably all, of its modems. The NEXT cancellation filters then converge and begin canceling NEXT based on the NEXT transfer functions measured during wake-up. Preferred methods of NEXT cancellation are described in Assignee's U.S. patent application Ser. No. 09/643,821 entitled "Next Cancellation for Modem Pools" and filed on Aug. 22, 2000, hereby incorporated by reference in its entirety. The NEXT cancellation filter's convergence criteria may be based on error signal of the filter adaptation process using conventional techniques.

As an alternative to steps 204 and 206 above, the time periods $T_{wu}$ or $RT_{wu}$ may be preset at RT 12, and not communicated to RT 12 by CO 10. $CO_{wu}$ may likewise be preset at CO 10. Furthermore, $CO_{wu}$ and $RT_{wu}$ need not be of equal length.

Figure 3:
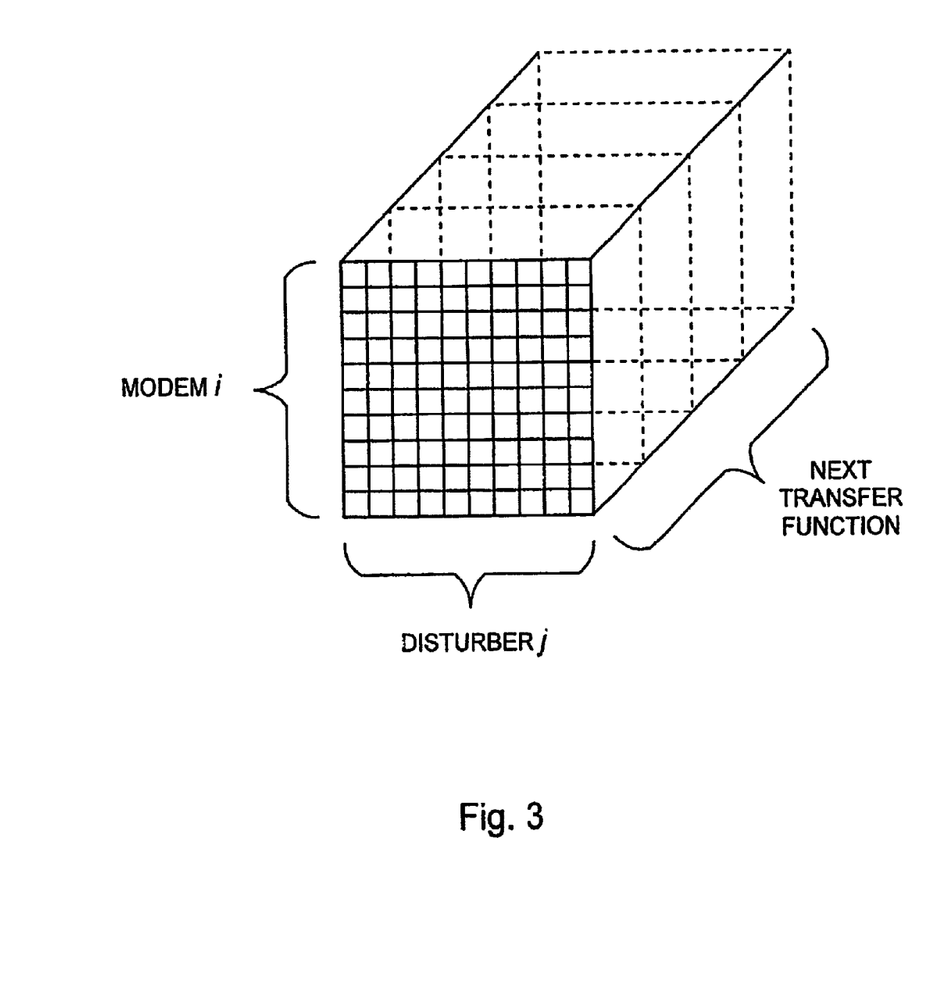
FIG. 3 is a simplified pictorial illustration of a NEXT transfer function matrix constructed using the method of FIG. 2.

Reference is now made to FIG. 3, which is a simplified pictorial illustration of a NEXT transfer function matrix constructed using the method of FIG. 2. As is shown in FIG. 3, for one or more, and preferably all, of the modems i in a modem pool, the method of FIG. 2 may be used to determine the NEXT transfer function vector for one or more, and preferably all, disturber modems j. The wake-up time limit $T_{wu}$ is preferably of a sufficient length for the complete NEXT transfer function matrix of FIG. 3 to be constructed in one or more measurement cycles as described hereinabove.

Figure 4:
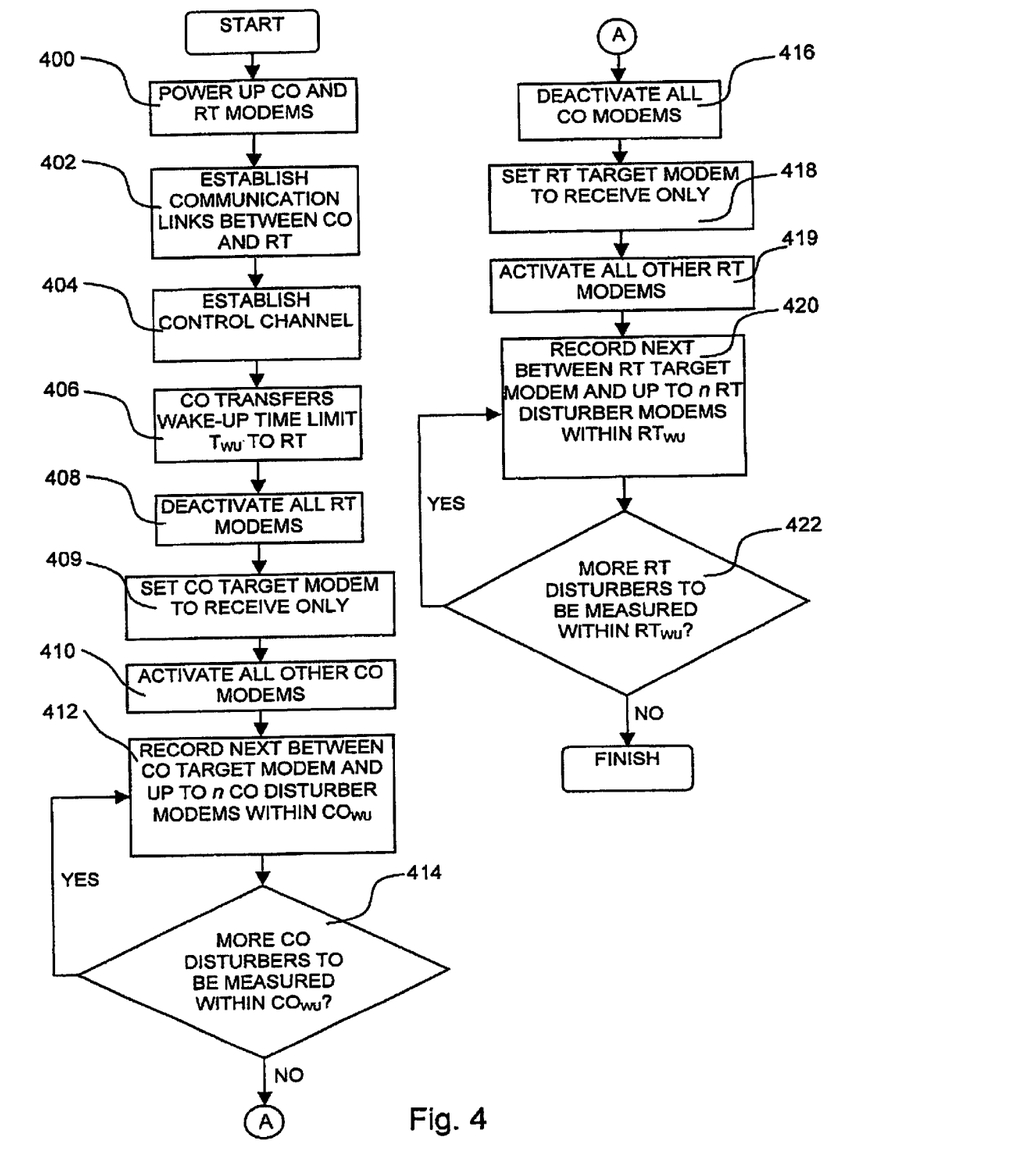
FIG. 4 is a simplified flowchart illustration of a method of modem wake-up of the system of FIG. 1, useful in understanding the present invention.

Reference is now made to FIG. 4, which is a simplified flowchart illustration of a method of modem wake-up of the system of FIG. 1, useful in understanding the present invention. The method of FIG. 4 is substantially similar to the method of FIG. 2 with the notable exception that the target modem whose NEXT is being measured is set to receive-only mode while one or more, and preferably all, other modems are activated at their maximum transmission rate and maximum power. Setting one modem to receive-only and one or more, and preferably all, potential disturbers to transmit ensures that only disturber NEXT is measured, and that the self-echo of the target modem is eliminated as a noise component.

Figure 5:
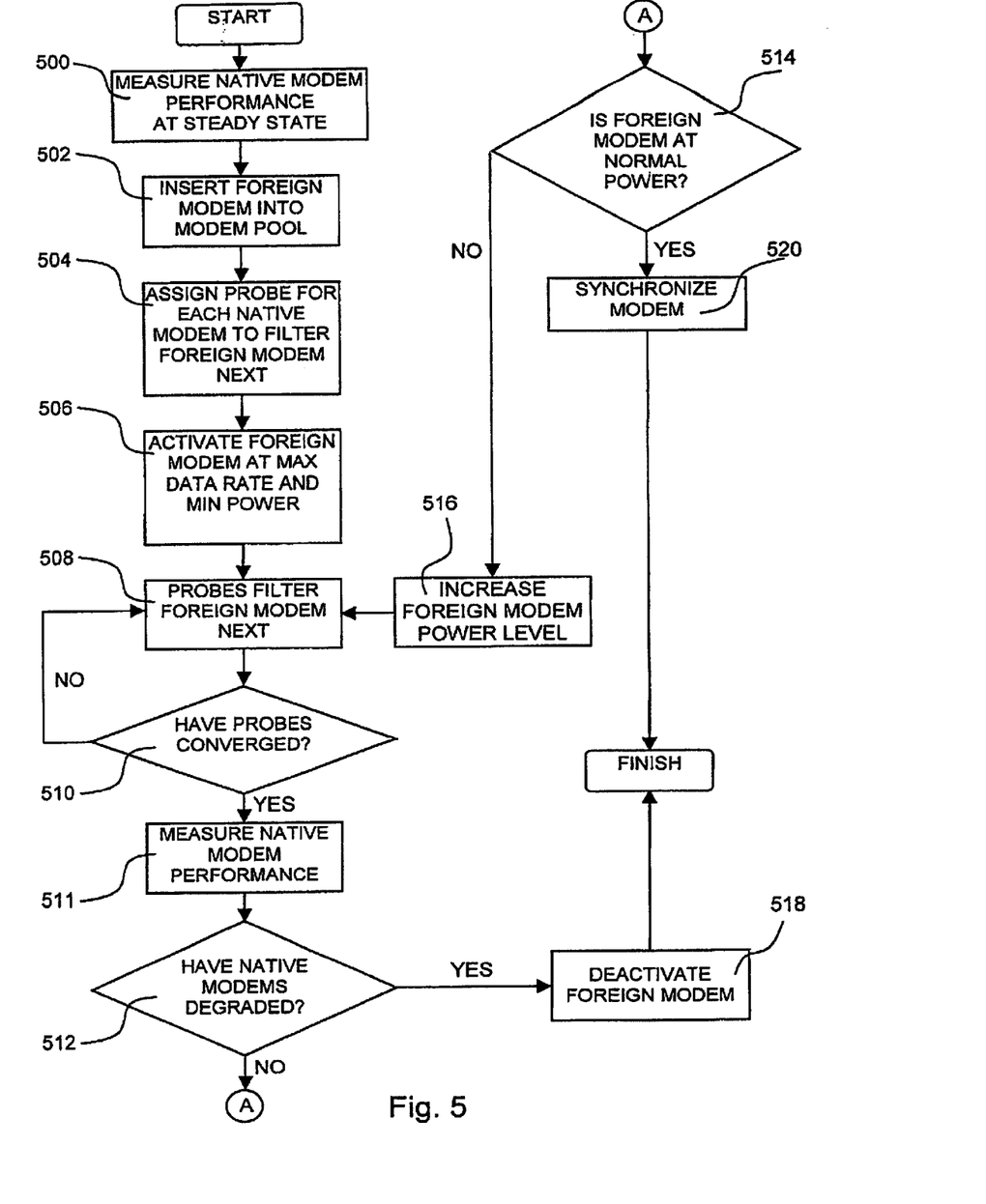
FIG. 5 is a simplified flowchart illustration of a method of modem wake-up at steady state, operative in accordance with a preferred embodiment of the present invention.

Reference is now made to FIG. 5, which is a simplified flowchart illustration of a method of modem wake-up at steady state, operative in accordance with a preferred embodiment of the present invention. The method of FIG. 5 may be applied to CO 10 or RT 12 of FIG. 1, or to both modem pools, and is typically applied with regard to a modem that is inserted into the modem pool, or otherwise becomes active within the modem pool, subsequent to performing modem wake-up of all other modems in the modem pool, such as is described hereinabove with reference to FIGS. 2 and 4.

In the method of FIG. 5, the modem pool has reached steady state, and the performance of each modem is measured (step 500) Modem performance may be expressed as the modem's signal-to-noise ratio (SNR) any as other measure of modem performance known in the art. A new modem, referred to herein as a "foreign" modem, is then inserted into to modem pool (step 502). "Insertion" of a "new modem" as used herein may denote the physical insertion and activation of a modem into the modem pool or simply the activation of an inactive modem that is already physically part of the modem pool. At least one NEXT cancellation filter is then assigned for each currently-active modem, referred to herein as a "native" modem, in the modem pool (step 504). These filters are referred to herein as "probes," as their task is to measure the NEXT caused to each native modem by the foreign modem. The foreign modem is then activated at a predetermined data rate, preferably at the foreign modem's maximum data rate, and at a predetermined power level, preferably at a minimum power level well below the foreign modem's normal operational power level (step 506). Preferably, no attempt is made at this point to synchronize the foreign modem, although the foreign modem's transmitted signal typically occupies the entire usable bandwidth. The probes then begin filtering the foreign modem's NEXT (step 508). Once the probes have adapted to the foreign modem's NEXT and converged (step 510), the performance of each modem is again measured (step 511) to determine whether its operation has "suffered" due to the insertion of the foreign modem (step 512). This may be expressed as a lowering of the native modem's SNR or by degradation in any other measure of modem performance known in the art. If no native modems have suffered due to the insertion of the foreign modem, and the foreign modem is not operating at it's normal operational power level (step 514), the power level of the foreign modem is increased (step 516), typically by a predetermined factor, and steps 508–514 are repeated. If any native modem is found to have suffered due to the insertion of the foreign modem then the foreign modem is deactivated (step 518). Once the foreign modem has reached it's normal operational power level without degrading the performance of any native modem, the foreign modem may perform normal synchronization to determine it's optimal data rate (step 520) and thus be successfully integrated into the modem pool.

It is appreciated that the foreign modem may activate its own NEXT cancellation filters to filter NEXT from the native modems at any time before, during, or after the wake-up procedure described in FIG. 5 and before synchronization is attempted.

Figure 6:
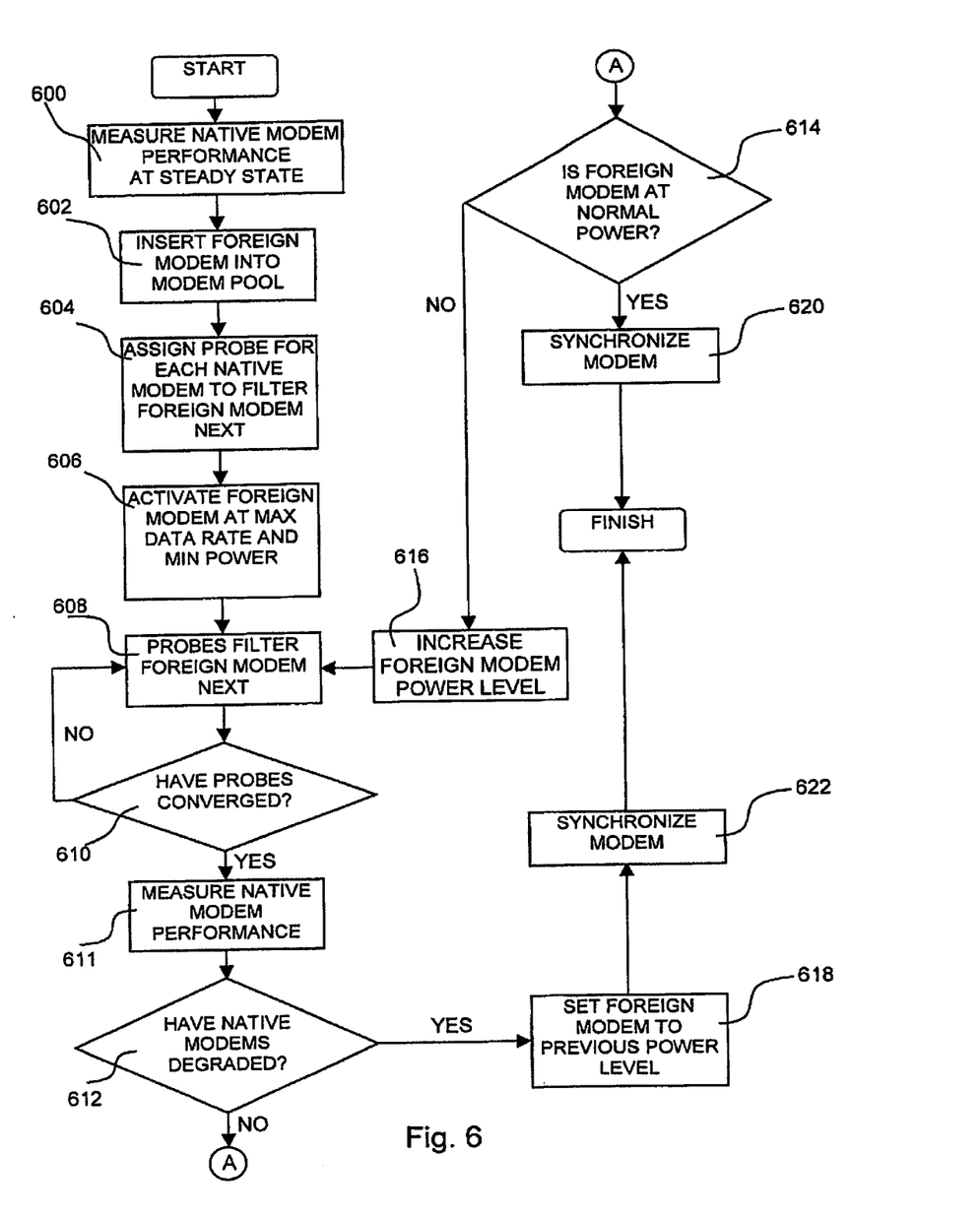
FIG. 6 is a simplified flowchart illustration of a method of modem wake-up at steady state, operative in accordance with a preferred embodiment of the present invention.

Reference is now made to FIG. 6, which is a simplified flowchart illustration of a method of modem wake-up at steady state, operative in accordance with a preferred embodiment of the present invention. The method of FIG. 6 is substantially similar to the method of FIG. 5 with the notable exception that, after the probes have converged (step 610), if the performance of one or more native modems is degraded due to the insertion of the foreign modem (step 612), the power level of the foreign modem is decreased to a previous power level which did not degrade native modem performance, if such a power level existed (step 618). The foreign modem may then perform normal synchronization to determine it's optimal data rate (step 622) and thus be successfully integrated into the modem pool.

It is appreciated that one or more of the steps of any of the methods described herein may be omitted or carried out in a different order than that shown, without departing from the true spirit and scope of the invention.

It is appreciated that the methods and apparatus described herein may be implemented using computer hardware and/or software using conventional techniques.

The disclosures of all patents, patent applications, and other publications mentioned in this specification and of the patents, patent applications, and other publications cited therein are hereby incorporated by reference.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. In a communications system having a modem pool for communicating via a communications channel, the modem pool comprising a plurality of native modems operating at steady state, a method for modem wake-up at steady-state comprising the steps of:
   a) measuring modem performance of any of said native modems;
   b) activating a foreign modem in said modem pool at substantially a maximum data rate and of said foreign modem at a power level that is below a normal operational power level of said foreign modem;
   c) allocating at least one near-end cross-talk (NEXT) cancellation filter as a probe filter;
   iteratively, until i) said foreign modem is operating at the foreign modem's normal operational power level, or ii) said modem performance of any of said native modems has degraded subsequent to activating said foreign modem:
      d1) canceling, using said probe filter, NEXT caused to at least one of said native modems by said foreign modem;
      d2) measuring said modem performance of any of said native modems; and
      d3) if said modem performance of any of said native modems has not degraded subsequent to activating said foreign modem, increasing said foreign modem's power level; and
   e) if said modem performance of any of said native modems has degraded subsequent to activating said foreign modem, deactivating said foreign modem.

2. A method according to claim 1 and further comprising synchronizing said foreign modem to an optimal data transmission rate.

3. A method according to claim 1 and further comprising activating at least one NEXT cancellation filter to filter NEXT caused to said foreign modem by any of said native modems.

4. In a communications system having a modem pool for communicating via a communications channel, the modem pool comprising a plurality of native modems operating at steady state, a method for modem wake-up at steady-state comprising the steps of:

a) measuring modem performance of any of said native modems;

b) activating a foreign modem in said modem pool at substantially a maximum data rate and at a power level that is below a normal operational power level of said foreign modem;

c) allocating at least one near-end cross-talk (NEXT) cancellation filter as a probe filter;

d) iteratively, until i) said foreign modem is operating at the foreign modem's normal operational power level, or ii) said modem performance of any of said native modems has degraded subsequent to activating said foreign modem:

d1) canceling, using said probe filter, NEXT caused to at least one of said native modems by said foreign modem;

d2) measuring said modem performance of any of said native modems; and d3) if said modem performance of any of said native modems has not degraded subsequent to activating said foreign modem, increasing said foreign modem's power level; and e) if said modem performance of any of said native modems has degraded subsequent to activating said foreign modem, decreasing said power level of said foreign modem to a previous power level at which said modem performance of any of said native modems had not degraded.

5. A method according to claim 4 and further comprising synchronizing said foreign modem to an optimal data transmission rate.

6. A method according to claim 4 and further comprising activating at least one NEXT cancellation filter to filter NEXT caused to said foreign modem by any of said native modems.

7. A communications system comprising:

a modem pool for communicating via a communications channel, said modem pool comprising a plurality of native modems operating at steady state;

an inactive foreign modem; and at least one near-end cross-talk (NEXT) cancellation filter, wherein said modem pool is operative to:

a) measure modem performance of any of said native modems;

b) activate said foreign modem in said modem pool at substantially a maximum data rate of said foreign modem and at a power level that is below a normal operational power level of said foreign modem;

c) allocate said at least one NEXT cancellation filter as a probe filter;

d) iteratively, until i) the foreign modem is operating at said foreign modem's normal operational power level, or ii) said modem performance of any of said native modems has degraded subsequent to activating said foreign modem:

d1) cancel, using said probe filter, NEXT caused to at least one of said native modems by said foreign modem;

d2) measure said modem performance of any of said native modems; and d3) if said modem performance of any of said native modems has not degraded subsequent to activating said foreign modem, increase said foreign modem's power level; and e) if said modem performance of any of said native modems has degraded subsequent to activating said foreign modem, deactivate said foreign modem.

8. A system according to claim 7 wherein said foreign modem is additionally operative to synchronize to an optimal data transmission rate.

9. A system according to claim 7 wherein said at least one NEXT cancellation filter comprises a plurality of NEXT cancellation filters, and wherein said foreign modem is operative to activate any of said plurality of NEXT cancellation filters to filter NEXT caused to said foreign modem by any of said native modems.

10. A communications system comprising:

a modem pool for communicating via a communications channel, said modem pool comprising a plurality of native modems operating at steady state;

an inactive foreign modem; and at least one near-end cross-talk (NEXT) cancellation filter, wherein said modem pool is operative to:

a) measure modem performance of any of said native modems;

b) activate said foreign modem in said modem pool at substantially a maximum data rate of said foreign modem and at a power level that is below a normal operational power level of said foreign modem;

c) allocate said at least one NEXT cancellation filter as a probe filter;

d) iteratively, until i) said foreign modem is operating at the foreign modem's normal operational power level, or ii) said modem performance of any of said native modems has degraded subsequent to activating said foreign modem:

d1) cancel, using said probe filter, NEXT caused to at least one of said native modems by said foreign modem;

d2) measure modem performance of any of said native modems; and d3) if said modem performance of any of said native modems has not degraded subsequent to activating said foreign modem, increase said foreign modem's power level; and e) if said modem performance of any of said native modems has degraded subsequent to activating said foreign modem, decrease said power level of said foreign modem to a previous power level at which said modem performance of any of said native modems had not degraded.

11. A system according to claim 10 wherein said foreign modem is additionally operative to synchronize to an optimal data transmission rate.

12. A system according to claim 10 wherein said at least one NEXT cancellation filter comprises a plurality of NEXT cancellation filters, and wherein said foreign modem is operative to activate any of said plurality of NEXT cancellation filters to filter NEXT caused to said foreign modem by any of said native modems.

* * * * *